US006877523B2

(12) United States Patent
Dempsey et al.

(10) Patent No.: US 6,877,523 B2
(45) Date of Patent: *Apr. 12, 2005

(54) MIXING VALVE WITH GRADUATED TEMPERATURE MODULATION

(75) Inventors: James F. Dempsey, North Olmsted, OH (US); John C. Holzheimer, Burton, OH (US); Matt R. Kesti, Cleveland, OH (US); Matthew R. Fehlner, Olmsted Falls, OH (US); Bryan Garvin, North Ridgeville, OH (US)

(73) Assignee: Moen Incorporated, North Olmsted, OH (US)

( * ) Notice: Subject to any disclaimer, the term of this patent is extended or adjusted under 35 U.S.C. 154(b) by 136 days.

This patent is subject to a terminal disclaimer.

(21) Appl. No.: 10/195,281

(22) Filed: Jul. 15, 2002

(65) Prior Publication Data

US 2002/0179144 A1 Dec. 5, 2002

Related U.S. Application Data

(63) Continuation-in-part of application No. 09/825,701, filed on Apr. 5, 2001, now Pat. No. 6,427,713.
(51) Int. Cl.[7] .................. G05D 11/03; F16K 11/078
(52) U.S. Cl. .................. 137/98; 137/597; 137/625.41
(58) Field of Search .................. 137/98, 100, 625.41, 137/597

(56) References Cited

U.S. PATENT DOCUMENTS

| 2,647,529 | A | * | 8/1953 | Wall | 137/98 |
|---|---|---|---|---|---|
| 3,448,755 | A | * | 6/1969 | Symmons | 137/100 |
| 3,469,595 | A | * | 9/1969 | Petursson | 137/100 |
| 3,987,819 | A | | 10/1976 | Scheuermann | |
| 4,156,438 | A | | 5/1979 | Kiesow | |
| 4,469,121 | A | * | 9/1984 | Moen | 137/100 |
| 6,123,094 | A | * | 9/2000 | Breda | 137/98 |
| 6,263,899 | B1 | * | 7/2001 | Zindler | 137/98 |

* cited by examiner

*Primary Examiner*—Stephen M. Hepperle
(74) *Attorney, Agent, or Firm*—Calfee, Halter & Griswold LLP (57) ABSTRACT

A valve assembly for mixing hot and cold water includes a generally cylindrical sleeve having hot and cold inlets and outlets and a rotatable non-reciprocal valve member positioned therein to control the mixture of hot and cold water in the outlet stream. The valve member has a hollow stem tube having hot and cold inlet and outlet ports which are rotatably engageable with the hot and cold inlets and outlets of the sleeve. The sleeve hot water outlet is generally larger than the sleeve cold water outlet. The sleeve and stem tube inlets and outlets are not limited to a particular shape and/or geometry. The fluid engagement between the sleeve hot and cold water outlets and the stem tube hot and cold water outlets provides a large mixed water temperature range.

19 Claims, 7 Drawing Sheets

MIXING VALVE WITH GRADUATED TEMPERATURE MODULATION

PRIORITY CLAIM

This is a continuation-in-part application of U.S. application Ser. No. 09/825,701, which was filed on Apr. 5, 2001 now U.S. Pat. No. 6,427,713 and which is incorporated herein by reference.

BACKGROUND OF THE INVENTION

The present invention relates to mixing valve, particularly mixing valves for kitchen or bath sinks, showerheads, tub spouts and shower-tub combinations. Current mixing valves provide a valve control member that regulates the temperature of the water. During use, the mixing valve can be rotated by the user from an off position through cold water, mixed water and hot water positions. The rotational position of the valve control member determines how much hot or cold water comprises the water outlet stream.

Mixing valves generally provide for either all cold water or all hot water streams without difficulty. During operation, a cold stream is easily obtained by incrementally rotating the mixing valve from an off position until a cold water stream is obtained. Similarly a hot water stream is easily obtained by fully rotating the mixing valve until the mixing valve can no longer rotate. However, most water users favor a mixed temperature outlet stream which is less tractable to obtain.

To begin with, the water user must manipulate the mixing valve using the faucet handle or knob until he obtains the desired combination of hot and cold water in the resulting water stream. Obtaining just the right temperature is difficult because the desired mixed temperature range position is very narrow resulting in substantial temperature changes in even an incremental rotational movement. If the user does not rotate enough, the water is still too cold, but if the user rotates too much the resulting hot water stream can injure or blister the skin of the water user. Even where no injury occurs, sudden changes in temperature of any kind are inconsistent with comfortable and soothing shower experience desired by users. Thus, there is a need for a mixing valve which provides a smoother and more gradual temperature transition between the hot and cold positions in order to give the user greater control in obtaining a mixed water stream and to minimize the possibility of the user's exposure to temperature extremes.

There is also a tendency for mixing valves to cause stacking. Stacking occurs where the water comes out of the showerhead while trying to use the tub spout and is caused when the hot and cold water form a vortex at the juncture between the tub port and shower bypass causing the pressure to increase at the shower bypass. When the pressure is high enough, the water will flow into the shower bypass and upwards to the showerhead. Thus, there is a need for a mixing valve which eliminates stacking by minimizing the pressure accumulation at the shower bypass.

Another drawback of current mixing valves is the noticeable difference in flow rates between the full cold water, mixed water and full hot water outlet streams. This difference may be particularly apparent between the mixed water and full hot water streams. Generally speaking, users desire high flow rates and thus high water pressure in the outlet stream because this helps the user rinse out soap and shampoo in less time than lower flow rates and water pressures. So, noticeable decreases in the flow rate and thus the water pressure represents an undesirable change to the user. It would therefore be beneficial to provide a mixing valve which minimizes the differences in flow rates between the outlet streams.

The present invention provides for a mixing valve having a gradual temperature transition through the use of tapered hot or cold water outlets within the mixing valve assembly. It also provides smoother fluid passageways to increase flow through the valve and eliminates stacking. The present invention further provides for increased corrosion resistance.

SUMMARY OF THE INVENTION

The present invention relates to a mixing valve assembly having a sleeve and a hollow stem tube positioned therein, both of which have tapered hot or cold water outlets to provide for graduated temperature modulation.

A primary purpose of the invention is to provide a mixing valve assembly with a tapered hot or cold water outlet which provides a smooth and graduated mixed water range.

Another purpose of the invention is to provide a mixing valve assembly having a sleeve and stem tube, both of which have a tapered hot or cold water outlet where the tapered outlets are engageable with each other to allow for gradual increases in the hot or cold water component of the overall water stream.

Another purpose of the invention is to provide a mixing valve assembly which gives the user greater control over water temperature by providing a greater range of mixed water temperatures.

Another purpose of the invention is to provide a mixing valve sleeve outer surface having upraised edges with radiused corners to improve and increase the outlet flow of the mixing valve assembly.

Another purpose of the invention is to provide a mixing valve assembly having a longitudinal rib located on the sleeve in order to minimize the effect of stacking.

Another purpose of the invention is to provide a valve seal having curved edges which improves outlet flow around the seal.

Another purpose of the invention is to provide a mixing valve assembly with graduated temperature modulation which also equalizes the pressure between the hot and cold water inlets.

Another purpose of the invention is to provide a mixing valve stem tube which has increased corrosion resistance.

Another purpose of the invention is to create a mixing valve stem tube made of metal injection molded 17-4PH stainless steel which is more corrosion resistant that prior stem tubes.

Another purpose of the invention is to provide a mixing valve stem which is connected to the mixing valve stem tube without the use of a roll pin which can create a crevice corrosion site.

Another purpose of the invention is to provide a mixing valve assembly which minimizes the differences between outlet streams of different temperatures, and in particular, minimizes the differences between the full hot water flow rate and the mixed water flow rate.

Another purpose of the invention is to provide a mixing valve assembly having an increased full hot water flow rate.

Another purpose of the invention is to provide a mixing valve assembly having a full hot water flow rate which is greater than that of the full cold water flow rate.

DETAILED DESCRIPTION OF THE INVENTION

Figure 1:
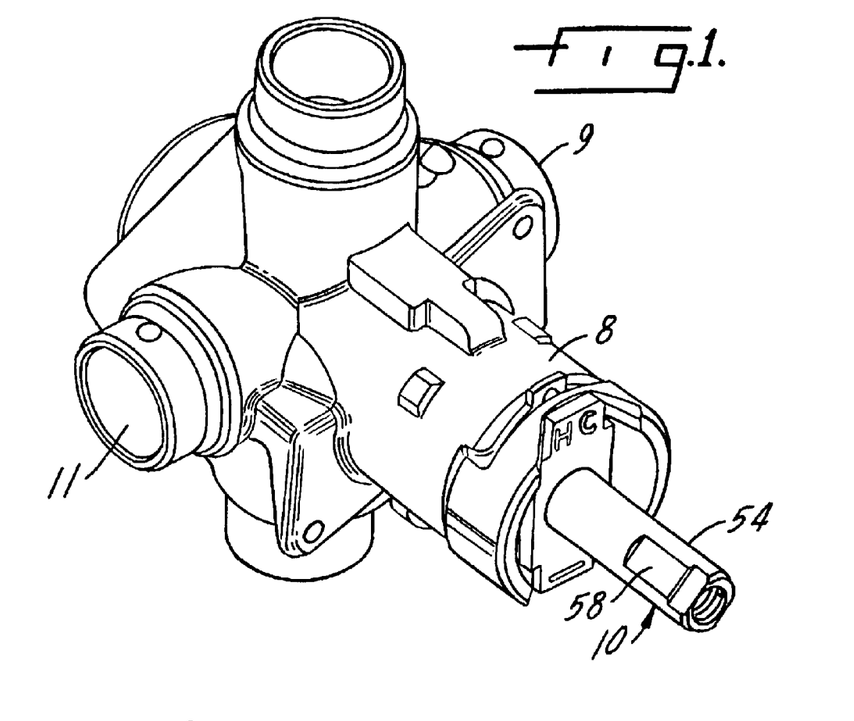
FIG. 1 is a perspective view of the valve housing with the valve assembly inserted therein.
Figure 2:
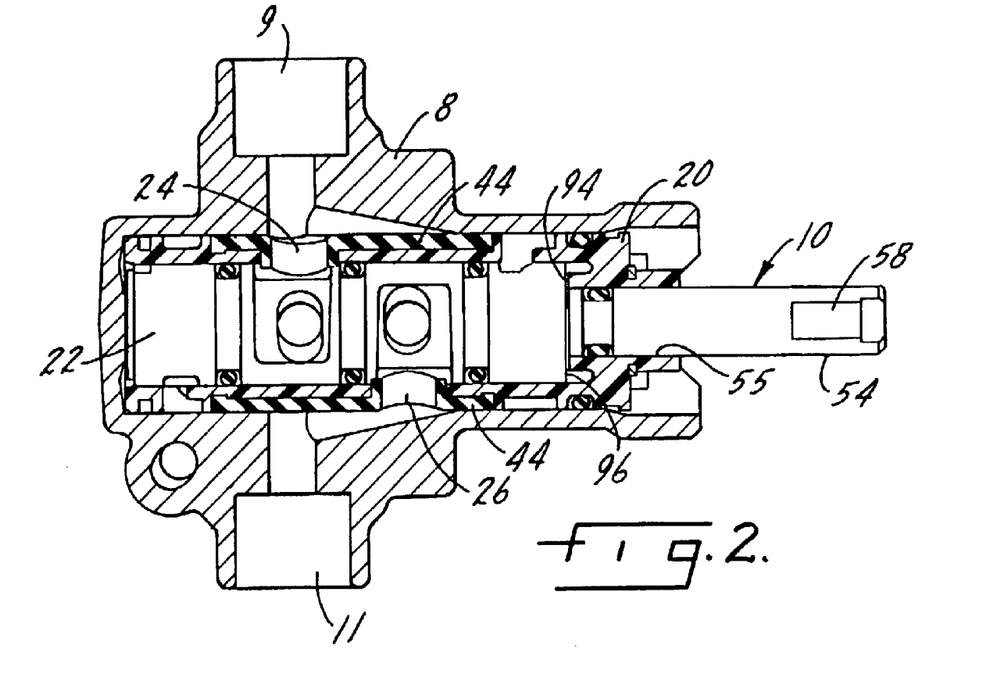
FIG. 2 is an axial section of the valve housing which shows hot and cold inlet ports.

As illustrated in FIGS. 1 and 2, the present invention includes a mixing valve assembly 10 which is insertable into a valve housing 8 with a cold water inlet port 9 and a hot water inlet port 11. The valve housing 8 is similar to that described in U.S. Pat. No. 4,469,121, which is incorporated herein by reference, assigned to Moen Incorporated and sold under the trademark Posi-Temp®. The valve assembly 10 includes a generally cylindrical sleeve 20 and a rotatable non-reciprocal valve member 22 positioned therein. The sleeve 20 has a cold water inlet port 24 and a hot water inlet port 26 which are axially spaced and radially non-aligned. A cold water outlet port 28 and a hot water outlet port 30 are radially non-aligned and are peripherally located from the sleeve cold and hot inlets 24, 26. As illustrated in FIGS. 3–13, at least one of the sleeve cold or hot water outlet ports 28 and 30 has a graduated or tapered portion.

Figures 3, 3A, 4, 5:
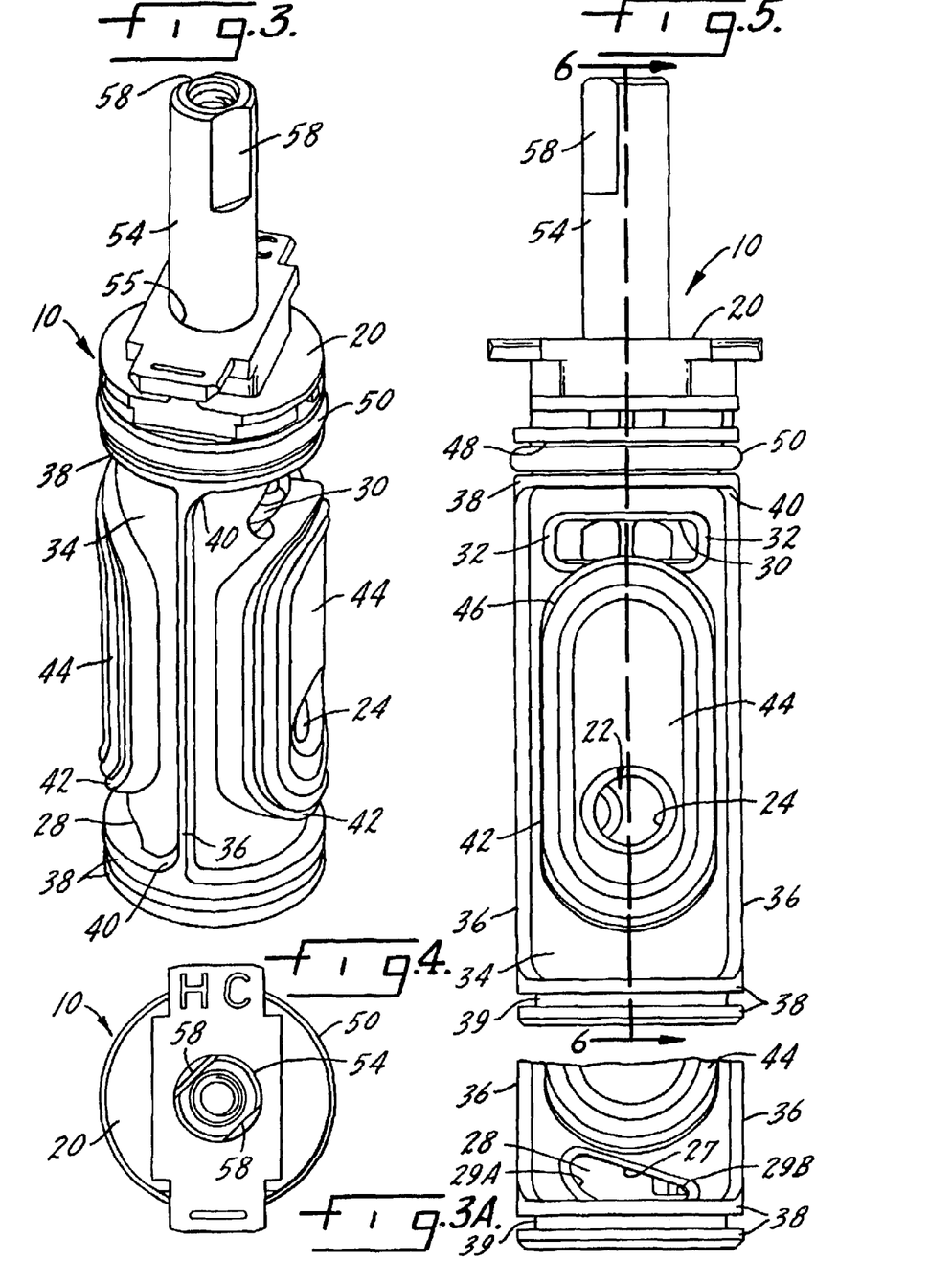
FIG. 3 is a top isometric view of the valve assembly.
FIG. 3A is a view of the bottom portion of the valve assembly as viewed from the left side of FIG. 3.
FIG. 4 is a top plan view of the valve assembly.
FIG. 5 is a side elevation view of the valve assembly.
Figures 6, 7, 8:
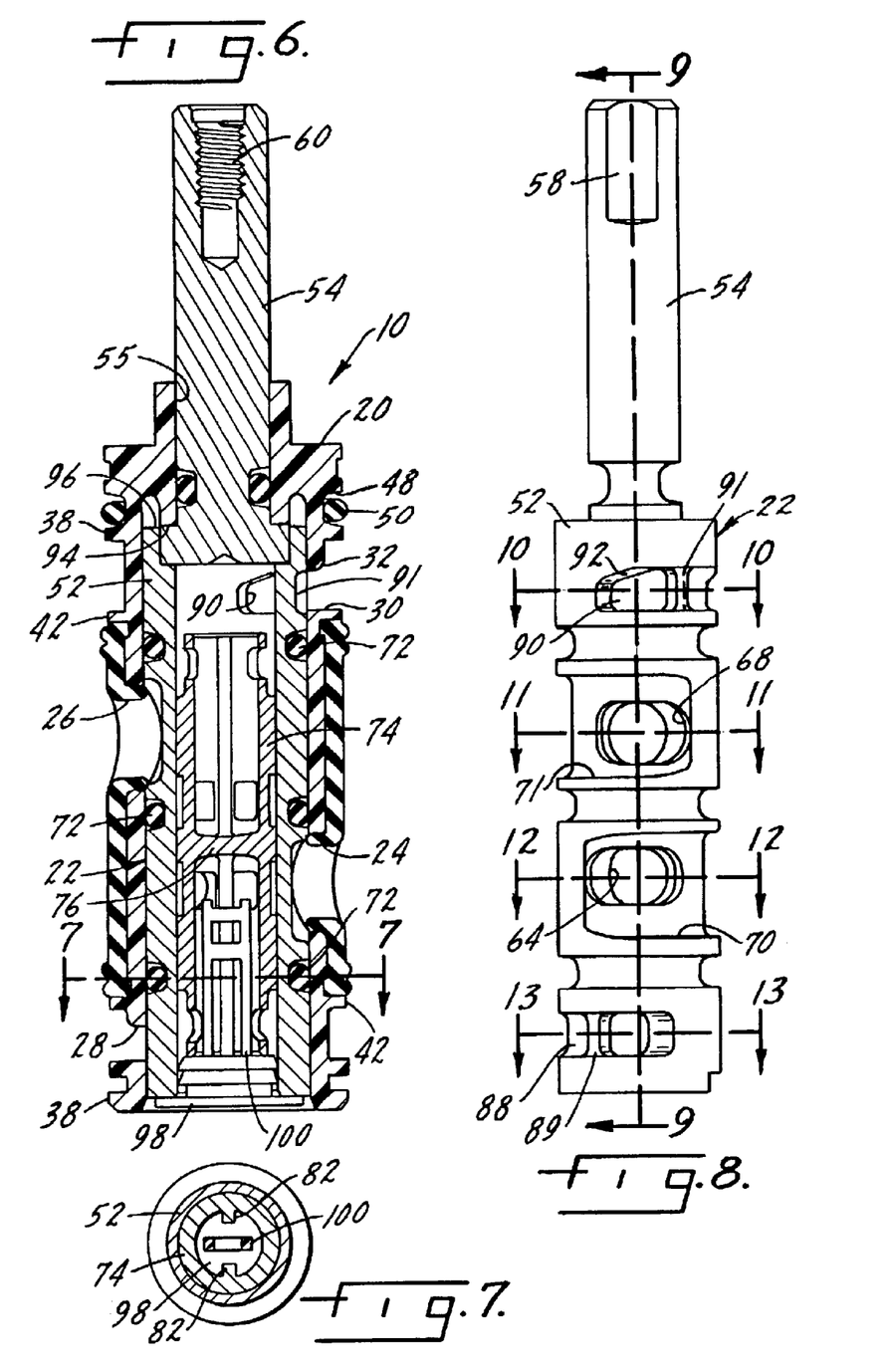
FIG. 6 is a vertical section of the valve assembly taken along line 6—6 of FIG. 5.
FIG. 7 is a section taken along line 7-7 of FIG. 6 with some parts omitted.
FIG. 8 is side elevation of the valve member.
Figure 9:
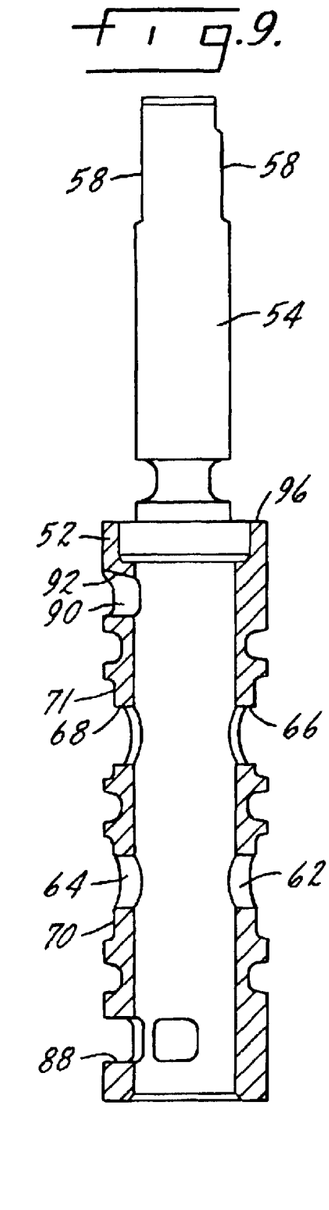
FIG. 9 is a section taken along line 9—9 of FIG. 8.
Figure 10:
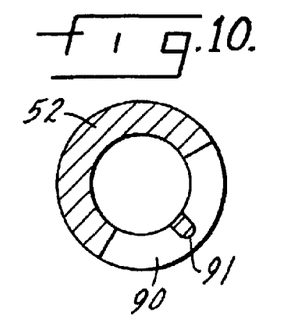
FIG. 10 is a section taken along line 10—10 of FIG. 8.

In FIGS. 3–5, the sleeve cold water outlet port 28 has a tapered portion, generally indicated at 27, which includes two circumferentially disposed ends 29A and 29B. One end 29A is larger than the other end 29B and the sleeve cold water outlet port 28 gradually narrows from the larger end 29A towards the smaller end 29B. The larger end 29A preferably corresponds to the portion of the sleeve cold water outlet port 28 which is initially put into register when the valve assembly is first moved from the closed position. As illustrated in FIGS. 3–5, the sleeve hot water outlet port 30 is generally rectangular in shape with tapered portions 32 on each circumferentially disposed end of the hot water outlet port. Between the sleeve outlets, the hot water outlet port 30 is generally larger than the cold water outlet port 28. In fact, the sleeve hot water outlet port 30 is approximately twice as large as the sleeve cold water outlet port 28 although the sleeve outlets are approximately equal in circumferential length. A sleeve outer surface 34 has longitudinally disposed ribs 36. The ribs 36 extend between two circumferentially disposed rims 38. The connection between the ribs 36 and the rims 38 has any number of curved or radiused corners 40 in order to insure smooth fluid passageways around the sleeve. As shown in FIG. 3, the radiused corners 40 are preferably located near either side of the hot or cold water outlets. One of the rims 38 which is closest to the sleeve cold water outlet is bifurcated into two annular rims with a groove 39 interposed therebetween. Although the groove 39 could be design to receive a seal, the bifurcated rim 38 is not intended for a seal and achieves a sufficient seal between the valve housing and the sleeve without the need for a seal to be placed within the groove 39.

The sleeve 20 also has embossed or raised edges 42 which extend around the periphery of each valve seal 44 and generally match the shape thereof The valve seals 44 are identical having a curved outer edges 46. The valve seals are also curved along a longitudinal axis so that the inner surface of the valve seals 44 engages the sleeve outer surface 34. The radiused corners 40 and the raised edges 42 have been shown to lessen flow losses and improve flow through the valve by 45 percent as compared to sleeves utilizing right angle corners for the valve seal and the rib. In other words, the present invention has been shown to achieve an improved flow of 6.8 gpm over other valves which allow only 4.7 gpm. The sleeve 20 has one or more annular grooves 48 for receiving elastomeric seals rings 50 therein in order to confine the water flow to defined areas. The seal rings 50 provide a water tight seal between the exterior of the sleeve and the interior of the valve housing.

In FIGS. 6–13, the valve member 22 has a hollow stem tube 52 and a stem 54, with the stem tube being attached to the stem with a sufficient press-fit load. The stem 54 protrudes out of a sleeve opening 55 when the valve assembly is positioned therein. The protruding end of the stem 54 has a flattened area 58 and a hollow-out portion 60 with internal threads located therein which will conventionally mount a decorative operating knob (not shown).

Figure 11:
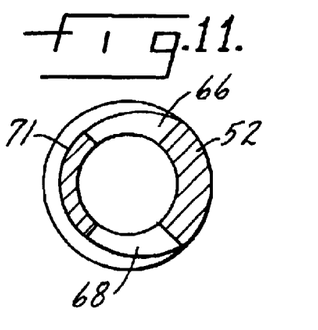
FIG. 11 is a section taken along line 11—11 of FIG. 8.
Figure 12:
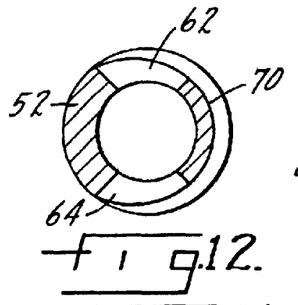
FIG. 12 is a section taken along line 12—12 of FIG. 8.
Figure 13:
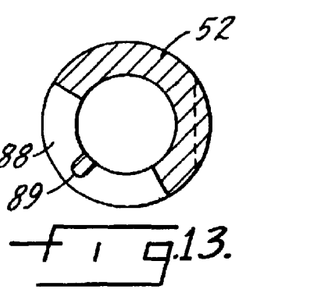
FIG. 13 is a section taken along line 13—13 of FIG. 8.
Figure 14:
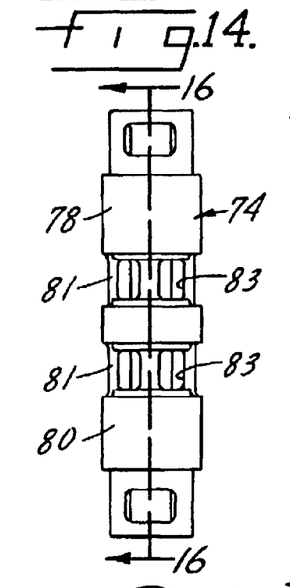
FIG. 14 is a side elevation of the balancing spool.
Figure 15:
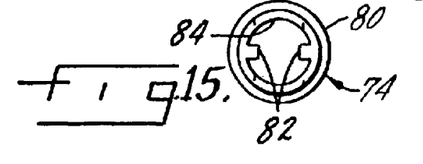
FIG. 15 is an end view of FIG. 14.
Figure 16:
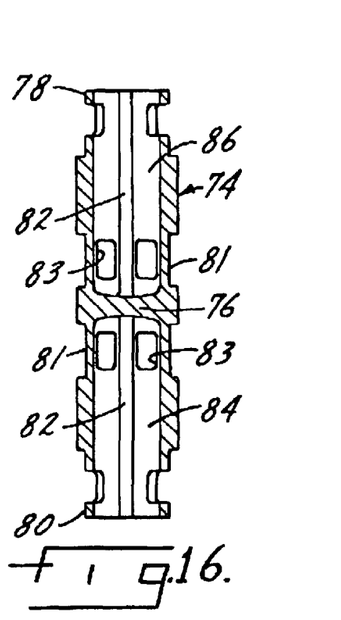
FIG. 16 is a section taken along line 16—16 of FIG. 15.
Figure 17:
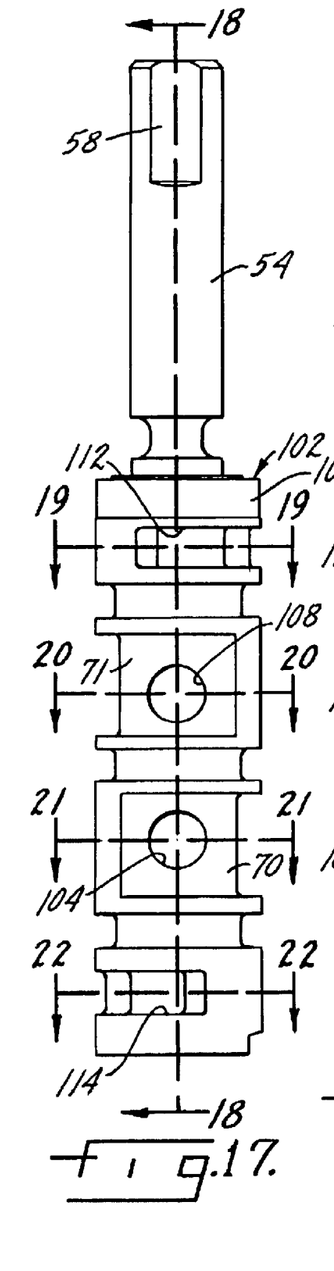
FIG. 17 is a side view of a second embodiment of a valve member.
Figure 18:
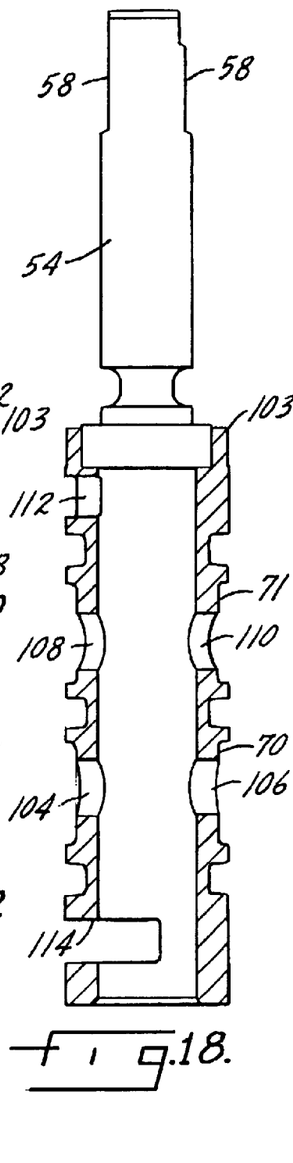
FIG. 18 is a section taken along line 18—18 of FIG. 17.
Figure 19:
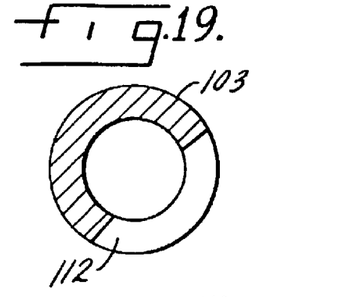
FIG. 19 is a section taken along line 19—19 of FIG. 17.
Figure 20:
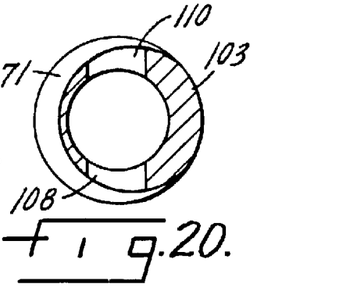
FIG. 20 is a section taken along line 20—20 of FIG. 17.
Figure 21:
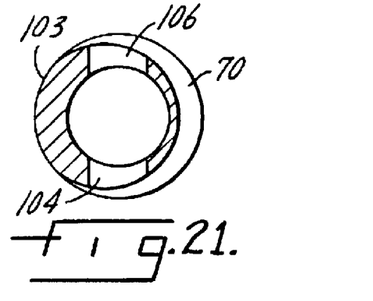
FIG. 21 is a section taken along line 21—21 of FIG. 17.
Figure 22:
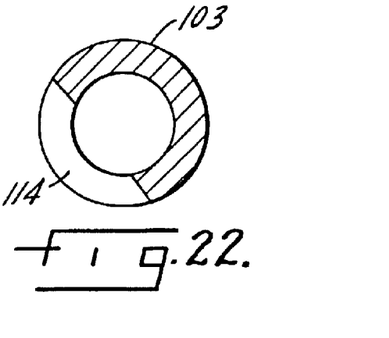
FIG. 22 is a section taken along line 22—22 of FIG. 17.

The stem tube 52 is hollow and has cold water inlet ports 62, 64 and hot water inlet ports 66, 68. The cold water inlet ports 62, 64 are radially aligned with each other as are the hot water inlet ports 66, 68. Both stem tube hot and cold inlet ports are generally rectangular and narrow as the inlets extend radially inward as illustrated in FIGS. 11 and 12. The cold water inlet ports are located within a circumferential recess 70 and the hot water inlet ports are similarly located in a circumferential recess 71. Each of the circumferential recesses 70, 71 is shown as extending approximately 270° around the stem tube. Although the recesses 70, 71 are not shown in alignment with respect to each other, other orientations are also possible. Adjacent the recesses, there are grooves holding seal rings 72 which are in contact with the interior of the sleeve 20. As shown in FIGS. 6–7 and 14–16, positioned within the hollow stem tube 52 is a reciprocally movable pressure balancing spool 74 having a center section 76 which is connected to two end spools 78 and 80 by axially spaced connectors 81 or the like. Located within the spool, there are axially disposed internally projecting ribs 82. The spool defines two chambers, a cold water chamber 84 and a hot water chamber 86 with each of the chambers 84, 86 having openings 83 to receive water therein. The cold water inlet ports 62, 64 open into the cold water chamber 84 and the hot water inlet ports 66, 68 open into the hot water chamber 86. The balancing spool 74 is movable in response to differing pressure at the cold and hot water inlets. The opposite sides of the spool center section 76 are in communication with the inlets and differing pressures at the inlets will vary the degree of overlap between end spools 78, 80 and the cold and hot water inlets, thereby maintaining equal hot and cold water pressure at the outlets.

The hollow stem tube 52 has two outlet ports, a cold water outlet port 88 and a hot water outlet port 90. The cold water port 88 has a reinforcing member 89 located approximately at the mid point of the port whereas the hot water port 90 similarly has a reinforcing member 91. The stem tube cold outlet port 88 can be moved into register with the sleeve cold outlet port 28 and the stem tube hot outlet port 90 can similarly be moved into register with the sleeve hot outlet port 30. When the stem tube cold outlet port 88 is moved into register with the sleeve cold outlet port 28, it also engages the tapered portion 27. The stem tube hot outlet port 90 has circumferentially disposed tapered portions or ends 92. One or both of the tapered ends 92 of the stem tube hot outlet port 90 engages with one or both of the tapered portions 32 of the sleeve hot outlet port 30 during operation of the valve assembly. Thus, when the stem tube hot outlet port is initially moved into register with the sleeve hot water outlet port one of the tapered ends will be in fluid engagement with the sleeve tapered portion 32 to provide a graduated temperature modulation.

As illustrated in FIG. 2, the stem tube 52 is rotable within the sleeve 20, but is fixed against reciprocal movement by a sleeve shoulder 94 at the right-hand end of the sleeve 20 and there is a cooperating cylindrical portion 96 on the stem tube which prevents reciprocal movement of the stem tube towards the right. The left-hand end of the stem tube abuts a portion of the valve housing, which prevents reciprocal to the left. Thus, the valve is rotatable but not reciprocal. Rotatable movement, as described above, permits the valve assembly to control the temperature of the resulting water stream. The valve is fully balanced in the open position in that spool 74 has surfaces, subject to hot and cold water pressure, which are equal in size and oppositely-positioned. Although the spool is reciprocally movable, it is held within the stem tube 52 by a plug member 98 which fits into the right-hand end of the stem tube. The plug member has a projection 100 which assists in centering the spool 74 within the stem tube 52. Rotational movement of the spool is limited when the projection 100 engages the ribs 82.

The valve assembly 10 has a design which improves the flow of water therethrough. For example, each of the cold and hot water inlet ports of the stem tube 52 is located in the circumferential recess 70, 71, respectively. When stem tube cold water inlet port 62 is moved into register with the sleeve cold water inlet 24, cold water is permitted to flow through both inlet ports 62, 64 because of the recess 70. Flow through inlet port 62 occurs directly and flow through inlet port 64 occurs indirectly through the recess 70. Similarly, when the stem tube inlet port 66 is moved into register with the sleeve hot water inlet 26 hot water is permitted to flow through both inlet ports 66, 68. In this way, an increased water flow is permitted through the valve assembly. FIGS. 3 through 16 illustrate a stem tube 52 having inlet ports 62, 64, 66 and 68 with a rectangularly shaped opening which tapers radially inwardly, as shown in FIGS. 11 and 12, for fluid communication with the water chambers 84, 86 of the spool 74. It is possible for the stem tube hot and cold inlet ports to have any type of shape to improve the water flow therethrough.

Water flow is also improved by the sleeve outer surface 34 which has radiused corners 40 and raised edges 42 which are designed to provide a smoother and more direct water flow over the sleeve as both the hot and cold water exit the sleeve outlet ports 28, 30. During operation of the mixing valve assembly, the ribs 36 eliminate the effect of stacking by decreasing the pressure at the junction between the tub port and shower bypass. Stacking is defined as water entering the shower riser pipe and potentially exiting the showerhead when the user desires to use the tub spout only. The ribs 36 assist in straightening the hot, cold or mixed water flow thus eliminating the vortex which tends to occur at the juncture. Overall, the present invention improves water flow through the valve by 45 percent.

The orientation of the inlet ports is important. Assuming a closed position and that the sleeve cold water inlet port 24 is located at 0°, the sleeve cold water outlet port 28 is located at 180°, the sleeve hot water inlet port 26 is located at 180° and the sleeve hot water outlet port 30 is located at 0°. The opening size provided by the sleeve cold and hot inlets generally match that of the stem tube inlets. When the valve is closed, the stem tube cold water inlet port 62 extends from 45° to 135° and the inlet port 64 extends from 225° to 315°. The stem tube hot water inlet ports 66, 68 are axially aligned with the cold water inlet ports 62, 64 in that hot water inlet port 66 extends from about 45° to 135° and hot water inlet port 68 extends from 225° to 315°. Whenever the valve is moved into an open position, both the hot and cold water inlet ports are capable of receiving hot and cold water which flows into the hot and cold water chambers.

The orientation of the cold and hot water outlet ports 88, 90 is also very important. In the same valve closed position, the cold water outlet port 88 extends from approximately 245° to 25°. The hot water outlet port 90 extends from 155° to 305° with each tapered end 92 comprising approximately 15° at each periphery thereof. Temperature modulations will vary at the outlet ports, depending on the orientation of the stem tube hot and cold water outlet ports 88, 90 with respect to the sleeve hot and cold water outlet ports 28, 30. The sleeve cold water outlet port 28 is generally smaller than the stem tube cold water outlet port 88, but has a length which is substantially similar to the stem tube outlet. The sleeve hot water outlet port 30 is generally equal in size to the stem tube hot water outlet port 90.

When the valve is moved from the closed position, the cold water inlet port 62 is moved into register with the sleeve cold water inlet port 24 and the hot water inlet port 66 is moved into register with the sleeve hot water inlet port 26. The stem tube and the sleeve will be in fluid communication with each other as cold water flows through the sleeve and stem tube cold water inlets into the cold water chamber 84. Upon continued rotation in a conventionally counterclockwise direction applied at the stem 54, the stem tube cold water outlet port 88 is moved into fluid engagement with the sleeve cold water outlet port 28, and more particularly, the outlet port 88 is moved into register with the larger end 29A of the tapered portion 27. Further counterclockwise rotation allows more of the tapered portion 27 of the sleeve cold water outlet port 28 to engage the stem tube cold water outlet port 88 with continued rotation allowing the stem tube outlet to engage the successively narrowing tapered portion 27 as between the ends 29A and 29B. Turning to the sleeve hot water outlet port, continued rotation of the valve assembly also allows the tapered portion 32 of the sleeve hot water outlet port to engage one of the tapered portions or ends 92 of the sleeve hot water outlet port 90. At this time there is still communication between the cold water outlet ports of the stem tube and the sleeve, thus providing an outlet stream which has a mixed water temperature. Further rotation allows more of the sleeve tapered portion 32 and the stem tube tapered portion 92 to engage each other. Continued rotation of the valve in a counterclockwise direction allow greater engagement between the stem tube hot outlet and sleeve hot outlet. The mixed water temperature range extends through approximately 120° or more of valve rotation thus providing a greater range of mixed temperature water. Finally, continuing in a counterclockwise direction, the cold water outlets will be closed and the hot water outlets will remain open so that the user may have full hot temperature. Importantly, the rotation in the mixed water temperature range provides a graduated temperature modulation and a larger mixed temperature range due to the tapered portions of each of the sleeve and the stem tube. The larger mixed temperature range is especially beneficial in providing the user with greater control during stem tube rotation to obtain a desired water temperature.

In FIGS. 3–13, the hollow stem tube 52 and pressure balancing spool 74 is made from a metal injection molding process using 17-4PH stainless steel which is chemically debound, sintered and honed to the finished part. The 17-4PH provides a greater corrosive resistant material than 303 machined stem tubes. Corrosion is also reduced at the crevice site between the stem tube and the stem due to a sufficient press fit load therebetween thus eliminating the need for a roll pin.

FIGS. 17 through 22 show an alternate valve member 102 with a hollow stem tube 103. The valve member is similar to the valve member 22 shown in FIG. 8, with like parts shown with like number, and is insertable into the sleeve 20. In this alternate valve, the cold water inlets 104, 106 and hot water inlets 108, 110 have a circular shape. Other shapes or the like are possible. The inlet openings cut straight through the stem tube rather than tapering radially inward. As illustrated in FIGS. 17–22, the circular shape of the inlet ports has a smaller cross-sectional area as compared to the inlet ports shown in FIGS. 3–13. In this way, when the valve is closed, the orientation of the inlet ports of the valve member 102 differs from the previously described valve member 22 in that the inlets 104, 106, 108 and 110 of the valve member 102 extend over a lesser degree range. For instance, the stem tube cold water inlet port 104 extends from approximately 45° to 105° and the stem tube cold inlet port 106 extends from approximately 225° to 285°. Likewise, the stem tube hot inlet ports 108, 110 extend from approximately 45° to 105° and 225° to 285°, respectively. The stem tube hot and cold inlets are generally similar in size or slightly smaller than the sleeve hot and cold water inlets.

Turning to stem tube hot and cold water outlet ports 112, 114 of FIGS. 17–22, in the same valve closed position, the hot water outlet port 112 extends from 155° to 315° and the cold water outlet port 114 extends from approximately 245° to 35°. Unlike the stem tube of FIGS. 3–13, the stem tube hot and cold water outlet ports 112, 114 do not have reinforcing members partitioning the ports. At least one of the hot and cold water outlet ports 112, 114 has a substantially rectangular shape. Similar to the invention described in FIGS. 3–16, rotation of the valve in a counterclockwise direction allows the stem tube cold water outlet port 114 to be moved into register with the tapered portion of the sleeve cold water outlet 28 and the stem tube hot water outlet port 112 to be moved into register with the tapered portions or ends of the sleeve hot water outlet 30 to provide a graduated temperature modulation.

The valve member 102 in FIGS. 17–22 is made by a screw machined process. In a screw machine process, the details of the stem tube are machined into the stem tube using appropriate tooling known to one skilled in the art. The process will generally result in sharper edges along the stem tube such as, for example, the grooves holding the seal rings 72, the edges which define the hot and cold inlet and outlet openings and the circumferential recesses 70, 71.

FIGS. 23–30 illustrate an alternate sleeve 120 and valve seal 122 of the present invention. The sleeve 120 has a generally cylindrical shape and defines a hollow interior for receiving the valve member. It is realized that the sleeve is capable of receiving any of the previously-described valve members as shown in FIGS. 6–13 and 17–22 or other valve members having alternate geometries. The assembly of the sleeve and the stem tube are received within the valve housing 8, as shown and described in FIGS. 1 and 2.

Figures 23, 24, 25, 26, 27:
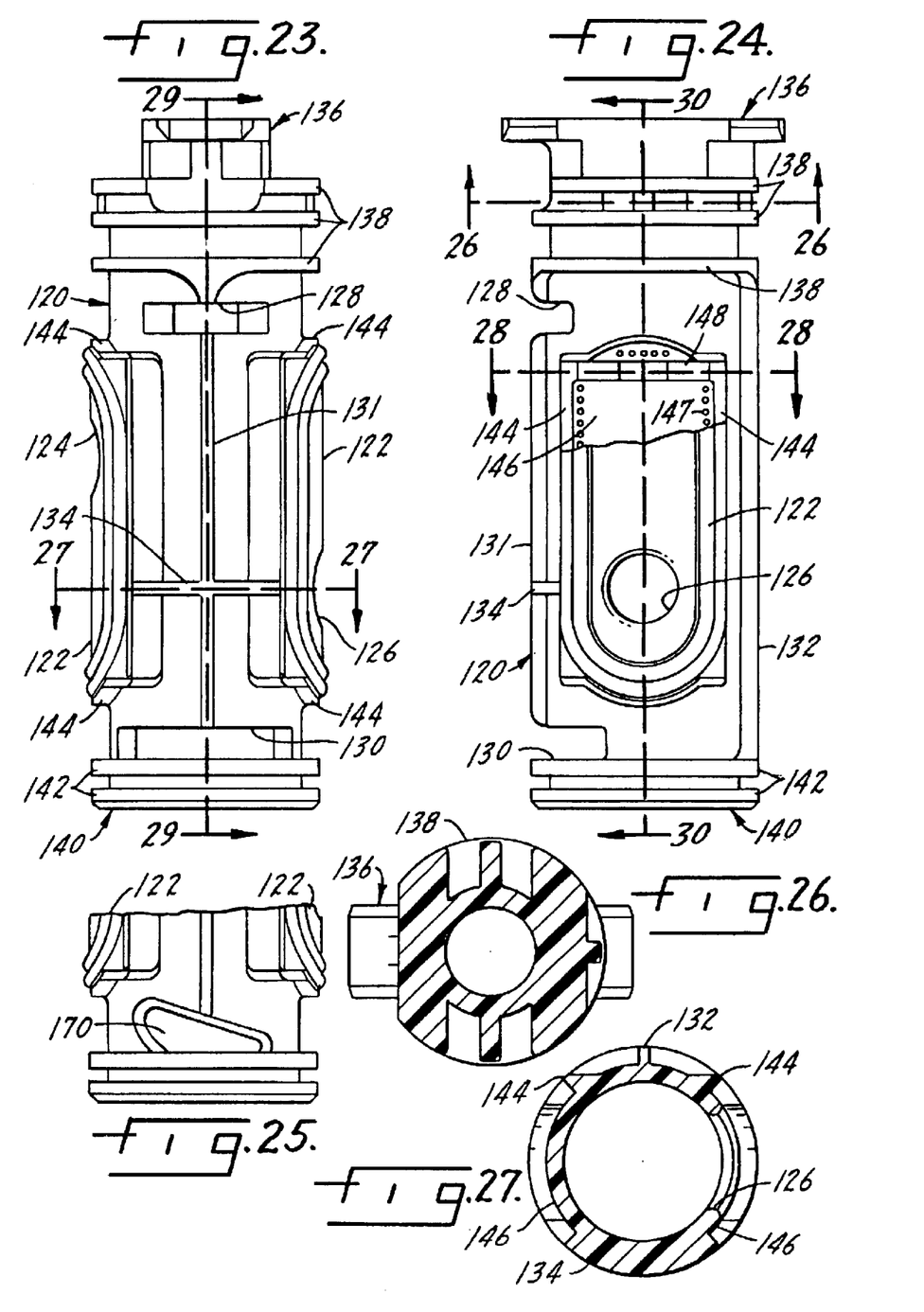
FIG. 23 is a side elevation view of an alternate sleeve and valve seal of the present invention.
FIG. 24 is a right side view of the view shown in FIG. 23.
FIG. 25 is a view of the bottom portion of the sleeve, similar to FIG. 23, showing an alternate geometry of the sleeve outlet port.
FIG. 26 is a section along line 26—26 of FIG. 24.
FIG. 27 is a section along line 27—27 of FIG. 23.

In FIGS. 23 and 24, the sleeve 120 is elongated along a longitudinal direction or sleeve axis and includes a cold water inlet 124 and a hot water inlet 126. The hot and cold water inlets are axially spaced from the longitudinal axis of the sleeve and radially non-aligned relative to each other. In FIG. 23 the cold water inlet 124 is positioned on the left side of the sleeve illustrated in FIG. 27 and the sleeve hot water inlet 126 is positioned on the right side of the sleeve. Although the sleeve hot and cold water inlets are illustrated as non-radially aligned, it is contemplated that other positions of the sleeve inlets are also possible without departing from this aspect of the present invention, including but not limited to radially aligned sleeve inlets.

In FIGS. 23–24 and 29–30 the sleeve 120 further includes a cold water outlet 128 and a hot water outlet 130, respectively, which are located peripherally of the sleeve cold and hot water inlets 124 and 126. As shown in FIGS. 23 and 24, the sleeve cold water outlet 128 is positioned near or at an upper portion, generally indicated at 136, of the sleeve and the hot water outlet 130 is positioned near or at a lower portion, generally indicated at 140, of the sleeve. The sleeve hot and cold water outlets are formed as circumferentially positioned slots in the sleeve. The sleeve hot and cold water outlets are shown having a generally rectangular shape or configuration, although other hole geometries are also possible including but not limited to a tapered geometry, as previously described above relative to any of the preceding Figures.

In FIGS. 23–24 and 29–30, the sleeve cold and hot water outlets 128 and 130 are radially aligned relative to one another. The sleeve cold water outlet 128 is positioned along the circumference of the sleeve at a location above the sleeve hot water outlet 130 and in spaced relationship therewith. The sleeve hot water outlet 130 is generally larger than the sleeve cold water outlet 128 and may be in fact approximately twice as large as the sleeve cold water outlet. For example in FIGS. 23 and 24, the sleeve hot water outlet 130 extends along a greater circumferential distance of the sleeve than the sleeve cold water outlet 128, although other shapes and configurations are possible.

In FIGS. 23 and 24 the outer surface of the sleeve includes front and rear longitudinally disposed ribs 131 and 132. These ribs are spaced 180° apart from one another along the circumference of the sleeve 120. The front longitudinally disposed rib 131 extends along the sleeve between the cold water outlet 128 and the hot water outlet 130. At an intermediate position between the hot and cold water outlets, a transverse rib 134 is positioned on the sleeve and intersects the front longitudinal rib 131. The transverse rib 134 is generally positioned on the sleeve closer toward the sleeve hot water outlet 130 although other positions are possible.

In FIGS. 23–26 the upper portion 136 of the sleeve includes a plurality of rims 138 positioned around the sleeve. Likewise, the lower portion 140 of the sleeve 120 includes one or more rims 142. These rims may serve a variety of purposes, such as, but not exclusively, for receiving a seal. The rims may extend circumferentially around all of the sleeve or, alternately, it may extend around a portion of the sleeve.

In FIGS. 23–24 and 27–28 the sleeve includes raised edges 144 which extend around the periphery of the valve seal and define a valve seal receiving surface 146. The valve seal receiving surface 146 may have a plurality of lightly raised projections 147 disposed thereon and located, for example, along the periphery of the valve seal receiving surface inside the raised edges 144. In addition, in FIGS. 24, 28 and 30 the seal receiving surface may include a recess 148 disposed at the upper and lower portions of the seal receiving surface 146. The projections and the recesses cooperate with an inner surface of the valve seal as best seen in FIG. 30 and will be described further below.

Figures 28, 29, 30, 31, 32, 33:
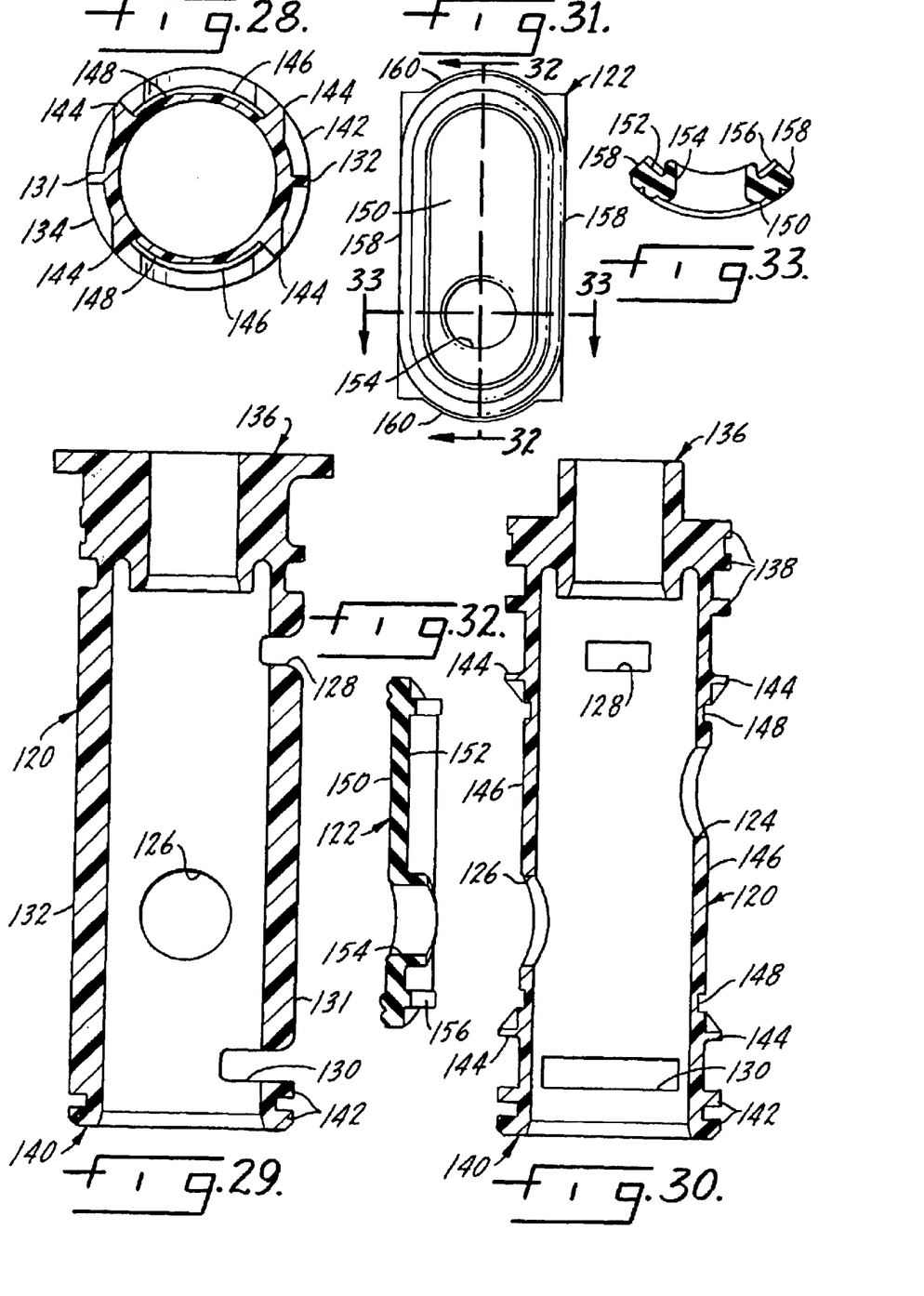
FIG. 28 is a section along line 28—28 of FIG. 24.
FIG. 29 is a section along line 29—29 of FIG. 23.
FIG. 30 is a section along line 30—30 of FIG. 24.
FIG. 31 is a side elevation view of the valve seal shown in FIGS. 23 and 24.
FIG. 32 is a section along line 32—32 of FIG. 31.
FIG. 33 is a section along line 33—33 of FIG. 31.

FIGS. 31 and 32 illustrate the valve seal 122 which includes an outer surface 150 and an inner surface 152. The valve seal includes an opening 154 which extends between the outer and inner surfaces 150 and 152. A portion of the valve seal which defines the opening 154 is generally received within one of the sleeve hot and cold water inlets 124 and 126. The inner surface 152 of the valve seal may further include one or more ribs 156 as best seen in FIG. 32. In FIG. 31 the periphery of the valve seal includes both straight and curved edges. As best seen in FIG. 31, the valve seal includes straight edges 158 along its sides and curved edges 160 along the upper and lower portions of the valve seal. As shown in FIG. 31, the edges intersect at corners. Other shapes are also contemplated and it is not intended that the valve seal be limited to the shape as shown. The surface texture of the valve may also vary. By way of example in FIGS. 32 and 33 portions of the valve seal outer surface may be smooth, whereas, other portions of the surface may have curves or undulations, as shown in FIGS. 32 and 33.

The interaction of the valve seal 122 with the sleeve 120 is best seen in FIGS. 30 and 32. By way of example, the valve seal 122 may be placed on the left side of the sleeve in the vicinity of the sleeve hot water inlet 126. The portion of the valve seal 122 which defines the opening 154 is inserted into the sleeve hot water inlet 126. At the same time, the ribs 156 of the valve seal are also received by the recesses 148 of the sleeve. The inner surface 152 of the valve seal 122 engages the lightly raised projections. The raised edges 144 surround the periphery of the valve seal 122 generally matching the shape of the valve seal. Thus, the valve seal 122 is received by the sleeve 120 in a friction engagement which ensures that the valve seal remains positioned during insertion of the mixing valve into the housing. In a similar manner, another valve seal may be placed on the right-hand side of the sleeve in FIG. 30, in an inverted direction to the valve seal shown in FIG. 32.

As compared to the sleeve of FIGS. 3–5, the sleeve in FIGS. 23–30 may have a similar orientation for its sleeve hot and cold water inlet ports. The sleeve hot and cold water outlet ports are both located on the sleeve at 90°, although the sleeve hot water outlet port is positioned at the lower portion 140 of the sleeve and the cold water outlet port is positioned at the upper portion 136 of the sleeve. The operation of the valve assembly is similar to that previously described relative to FIGS. 1–22, with the exception that a mixing valve with the sleeve described in FIGS. 23–32 has hot water flowing in and out of the left-hand side of the mixing assembly relative to FIG. 2 and cold water flowing in and out of the mixing valve assembly on the right-hand side of the sleeve in FIG. 2. In a similar manner, as previously described, the mixing valve assembly with a sleeve shown and described in FIGS. 23–32 can be rotated in a counterclockwise direction within a range of approximately 0° to 270°. For example, counterclockwise rotation between approximately 0° and 90° will achieve a full cold water stream. Rotation between approximately 90° and 200° will achieve a mixed temperature water stream and between approximately 200° and 270° results in a full hot water stream. Although typically the total effective rotational range of the mixing valve from an off position to a full counterclockwise position will be somewhat less than 360°, such as 270° in the above example, it will be realized that the range of full hot water, full cold water and mixed temperature water ranges will vary depending on the total effective rotational range of the mixing valve. The range of mixed temperature water may be as much as 120° or more, as previously described relative to FIGS. 1–22. The mixed temperature water range may be as much as at least half the total effective rotational range provided by the mixing valve. For example, if the effective range is 270°, the range of mixed temperature water may range approximately 100° to 135°. So, it can be seen that a greater range of mixed temperature water is provided.

When the sleeve as shown in FIGS. 23–32 is assembled and a corresponding valve member inserted therein, the resulting flow stream provides a greater full hot water flow rate. The greater resultant flow rate for hot water is due at least in part to the relative position of the sleeve hot water inlet 126 and the hot water inlet port 11 of the housing 8. When the sleeve 120 is inserted into the valve housing 8 shown in FIG. 2, it is contemplated that the sleeve hot water inlet is located in general coaxial alignment with the central channel of the hot water inlet port 11, i.e., the sleeve hot water inlet 126 is positioned in place of the previous sleeve cold water inlet 24 in FIG. 2. On the other hand, the sleeve cold water inlet 124 is located so that it receives cold water via the angled branch of the cold water inlet port 9. By comparison, the flow of water into the sleeve hot water inlet 126 is less constricted than the flow of cold water thus resulting in a greater flow of hot water in the mixed and full hot water positions of the mixing valve. Relative to FIG. 2, locating the sleeve hot water inlet and outlets on the left-hand side of the mixing valve generally allows the flow of hot water to be less restricted than the inlet and outlets located on the right-hand side of the sleeve so more hot water is allowed to flow into and out of the mixing valve and provide a greater flow rate of hot water through the mixing valve. In addition, the greater hot water flow rate is facilitated by the relative difference in size of the sleeve hot water outlet as compared to the sleeve cold water outlet. As previously described, the sleeve hot water outlet is generally larger and may be as much as twice as large as the sleeve cold water outlet so as to allow a greater flow rate of hot water through the mixing valve.

By way of example, in a full cold water position the flow rate from the mixing valve may be approximately 3.6 gpm. In a mixed water temperature position, the flow rate from the mixing valve may be approximately 5.5 gpm at 50 psi. At a full hot water position of the mixing valve the flow rate may be approximately 4.6 gpm. So, as the user rotates the mixing valve counterclockwise, from a full cold water position to a mixed water temperature position, the flow rate of the resulting water stream will increase as the hot water component increases. Thereafter, as the mixing valve is moved from a mixed water position to a full hot water position, the change in flow rate does not decrease dramatically due to the absence of the cold water component. The change is approximately less than 1 gpm. As compared to the change between the full cold and mixed water flow, the perception of change in flow rate of water between the mixed water and full hot water outlet streams is minimized such that it is not as easily perceived by the user.

Furthermore, the mixing valve provides a graduated temperature modulation in that it provides a greater range of mixed water temperature. The range of mixed water temperature can be varied, for example, by providing tapered portions along one or both of the sleeve inlets and outlets and/or one or more of the stem tube inlets and outlets. It is also possible to vary the size and/or geometry of either the sleeve and/or the stem tube inlet and outlets relative to one another. For example, although in FIGS. 23 and 24 the sleeve inlets are shown having a circular shape, and the sleeve outlets are shown having a non-circular shape, the sleeve inlets and outlets are not exclusively limited to these shapes. One or more of the sleeve hot and cold water outlets may also have a tapered portion, as previously described. One of the sleeve hot and cold water outlets may also have substantially rectangular shape, also as previously described. The circumferential size and positioning of sleeve outlets may be modified. Similar variations are also possible for the stem tube hot and cold water outlet ports which have been previously shown having both circular and non-circular shapes. Numerous variations may be made to the sleeve inlets and outlets, as well as the stem tube inlets and outlets without departing from this aspect of the present invention.

In FIG. 25, another sleeve is illustrated having a sleeve hot water outlet 170 which has an alternate non-circular shape or geometry. Similar to the tapered outlet illustrated in FIG. 3A, the circumferentially disposed ends of the sleeve outlet 170 in FIG. 25 has one end which is larger than the other end. The outlet 170 undergoes a gradual narrowing or tapering in size from the larger end to the smaller end. The larger end of the outlet 170 preferably corresponds to the portion of the sleeve which is initially put into register when the valve is moved from a closed position. It is possible for any one or more of the sleeve inlets and outlets to have an alternate geometry. Other shapes and configurations are contemplated in addition to the circular and non-circular geometries illustrated.

In addition, relative to the sleeve, the sleeve outlets may be positioned in radial alignment, or alternatively, may be non-radially aligned. The axial orientation of the sleeve outlets may be varied. Numerous variations in the radial and axial position are also possible for the sleeve inlets as well as the stem tube inlets and outlets. Other shapes and configurations are also possible for the valve seal relative to the shape of its side edges, as well as the top and bottom edges, in addition to variations as to its inner and outer surfaces.

In the sleeve of FIG. 23, it is contemplated that the transverse rib 134 minimizes temperature control problems at low pressure, and in particular will control the temperature within a certain minimum range, such as for example approximately 3°, when one of the hot or cold water pressures drops by 50 percent. This situation may occur for example, when a toilet is flushed. The transverse rib prevents water from the high pressure outlet flowing into the low pressure outlet and effecting the temperature control of the mixing valve. The size and geometry of the rib may be varied.

Whereas the preferred forms of the invention has been shown and described herein, it should be realized that there may be many modifications, substitutions and alterations thereto without departing from the scope of the claims. For example, the tapered portion may be at positioned at any location along the length of the inlet and outlet ports of either of the sleeve or stem tube. The tapered portion of either the sleeve hot water outlet port or the sleeve cold water outlet port may span all or a portion along the length thereof. Although the sleeve hot water outlet is shown as having two tapered portions or ends, it is possible that either circumferentially disposed end of the sleeve hot water outlet port may be tapered. Similarly, as to the stem tube, one or both of the circumferentially disposed ends of the stem tube hot water outlet port may have a tapered portion or end. Where each of the sleeve and the stem tube have one tapered portion or end any orientation is possible. However, it may be preferred to locate the tapered portions in such a way that they are initially in fluid engagement when both the sleeve and stem tube hot water outlet ports are first put into register with each other while the valve is opened. Although the preferred shape of the tapered portions of the sleeve hot and cold outlets are shown, it is realized that modification to the geometry may be made. Similarly, modifications to the geometry of the tapered portion of the stem tube outlet may also be made.

What is claimed is:

1. A valve assembly for mixing hot and cold water including:

a generally cylindrical sleeve having axially spaced hot and cold water inlets in the side thereof, axially spaced hot and cold outlets in said sleeve located peripherally of said inlets, said sleeve hot water outlet being larger than sleeve cold water outlet;

a rotatable non-reciprocal valve member positioned within said sleeve to control the mixture of hot and cold water, said valve member including a hollow stem tube having hot and cold water inlet and outlet ports therein and a seal-less reciprocally movable pressure balancing spool positioned within said stem tube, said spool and stem tube providing two spaced chambers, said stem tube cold water inlet and outlets ports opening into one chamber and said stem tube hot water inlet and outlet ports opening into the other chamber, with a portion of said chamber walls forming balancing surfaces such that said spool provides for balancing of pressures between the hot and cold water inlet ports, wherein fluid engagement between said sleeve hot and cold water outlets and said stem tube hot and cold water outlet ports providing a full hot water flow range, a full cold water flow range and a mixed hot and cold water flow range, the mixed hot and cold water flow range being greater than selected one of the full hot water and full cold water flow ranges;

and a valve seal positioned on said sleeve at each of said sleeve hot and cold water inlets and extending therethrough for sealing contact with said valve member.

2. The valve assembly of claim 1 wherein said sleeve hot water outlet is approximately twice as large as said sleeve cold water outlet.

3. The valve assembly of claim 1 wherein the mixed hot and cold water flow is in the range of approximately 5.5 gpm to 6.8 gpm.

4. The valve assembly of claim 1 wherein the mixed hot and cold water flow is greater than the full hot water flow by an amount approximately less than 1 gpm.

5. The valve assembly of claim 1 wherein the full hot water flow is greater than the full cold water flow.

6. The valve assembly of claim 1 wherein the mixed hot and cold water flow range is approximately half the effective rotational range of the mixing valve assembly.

7. The valve assembly of claim 1 wherein at one of said sleeve hot and cold water outlets has a non-circular shape.

8. The valve assembly of claim 1 wherein at one of said sleeve hot and cold water outlets has a circular shape.

9. The valve assembly of claim 1 wherein said sleeve hot and cold water outlets are radially aligned.

10. The valve assembly of claim 1 wherein said sleeve hot and cold water outlets are non-radially aligned.

11. The valve assembly of claim 1 wherein at least one of said sleeve hot and cold water outlets has at least one tapered portion.

12. The valve assembly of claim 1 wherein at least one of said sleeve hot and cold water outlets has a substantially rectangular shape.

13. The valve assembly of claim 1 wherein the sleeve includes a plurality of axially spaced ribs.

14. The valve assembly of claim 13 wherein at least one rib is longitudinally disposed along the sleeve.

15. The valve assembly of claim 13 wherein at least one rib is laterally disposed along the sleeve.

16. The valve assembly of claim 1 wherein a sleeve outer surface has a plurality of raised edges which extend around the periphery of said valve seal and generally matches the shape thereof.

17. The valve assembly of claim 16 wherein said valve seal has curved edges.

18. The valve assembly of claim 16 wherein said valve seal has straight edges.

19. A valve assembly for mixing hot and cold water including:

a generally cylindrical sleeve having axially spaced and radially non-aligned hot and cold water inlets in the side thereof, axially spaced and radially aligned hot and cold outlets in said sleeve located peripherally of said inlets;

a rotatable non-reciprocal valve member positioned within said sleeve to control the mixture of hot and cold water, said valve member including a hollow stem tube having hot and cold water inlet and outlet ports therein and a seal-less reciprocally movable pressure balancing spool positioned within said stem tube, said spool and stem tube providing two spaced chambers, said stem tube cold water inlet and outlets ports opening into one chamber and said stem tube hot water inlet and outlet ports opening into the other chamber, with a portion of said chamber walls forming balancing surfaces such that said spool provides for balancing of pressures between the hot and cold water inlet ports;

and a valve seal positioned on said sleeve at each of said sleeve hot and cold water inlets and extending therethrough for sealing contact with said valve member.

* * * * *